United States Patent
Chang et al.

(10) Patent No.: US 7,060,752 B2
(45) Date of Patent: Jun. 13, 2006

(54) SYNTHESIS AND USE OF NITROPHENOL RESINS

(75) Inventors: Young-Tae Chang, New York, NY (US); Jaw Wook Lee, New York, NY (US)

(73) Assignee: New York University, New York, NY (US)

( * ) Notice: Subject to any disclaimer, the term of this patent is extended or adjusted under 35 U.S.C. 154(b) by 282 days.

(21) Appl. No.: 10/694,353

(22) Filed: Oct. 28, 2003

(65) Prior Publication Data

US 2004/0087726 A1    May 6, 2004

Related U.S. Application Data

(60) Provisional application No. 60/421,568, filed on Oct. 28, 2002.

(51) Int. Cl.
*C08F 8/30* (2006.01)
(52) U.S. Cl. ............... 525/123 C; 525/124; 525/328.2; 525/332.2; 525/374; 525/380; 536/22; 536/23; 536/24; 536/25; 536/26; 536/27; 536/28; 536/29

(58) Field of Classification Search ............... 525/123, 525/124, 328.2, 374, 332.2, 380; 536/22, 536/23, 24, 25, 26, 27, 28, 29
See application file for complete search history.

(56) References Cited

U.S. PATENT DOCUMENTS 5,153,319 A  *  10/1992  Caruthers et al. .......... 536/25.3
5,217,866 A  *  6/1993  Summerton et al. .......... 435/6
5,587,426 A  *  12/1996  Yukawa et al. ............. 525/124

* cited by examiner

*Primary Examiner*—Bernard Lipman
(74) *Attorney, Agent, or Firm*—Browdy and Neimark, PLLC

(57) ABSTRACT

Nitrophenol resins based upon various support materials. The nitrophenol resins are prepared by amide bond formation between a hydroxyl nitro benzoic acid and an aminoalkyl polymer support.

11 Claims, 1 Drawing Sheet

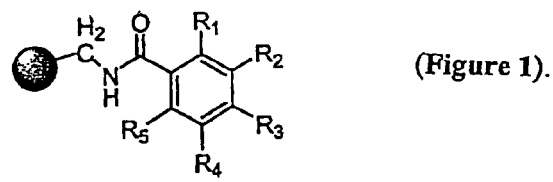
(Figure 1).
Figure 2. LC-MS trace for of amide products using a variety of amines and benzoyl-4a
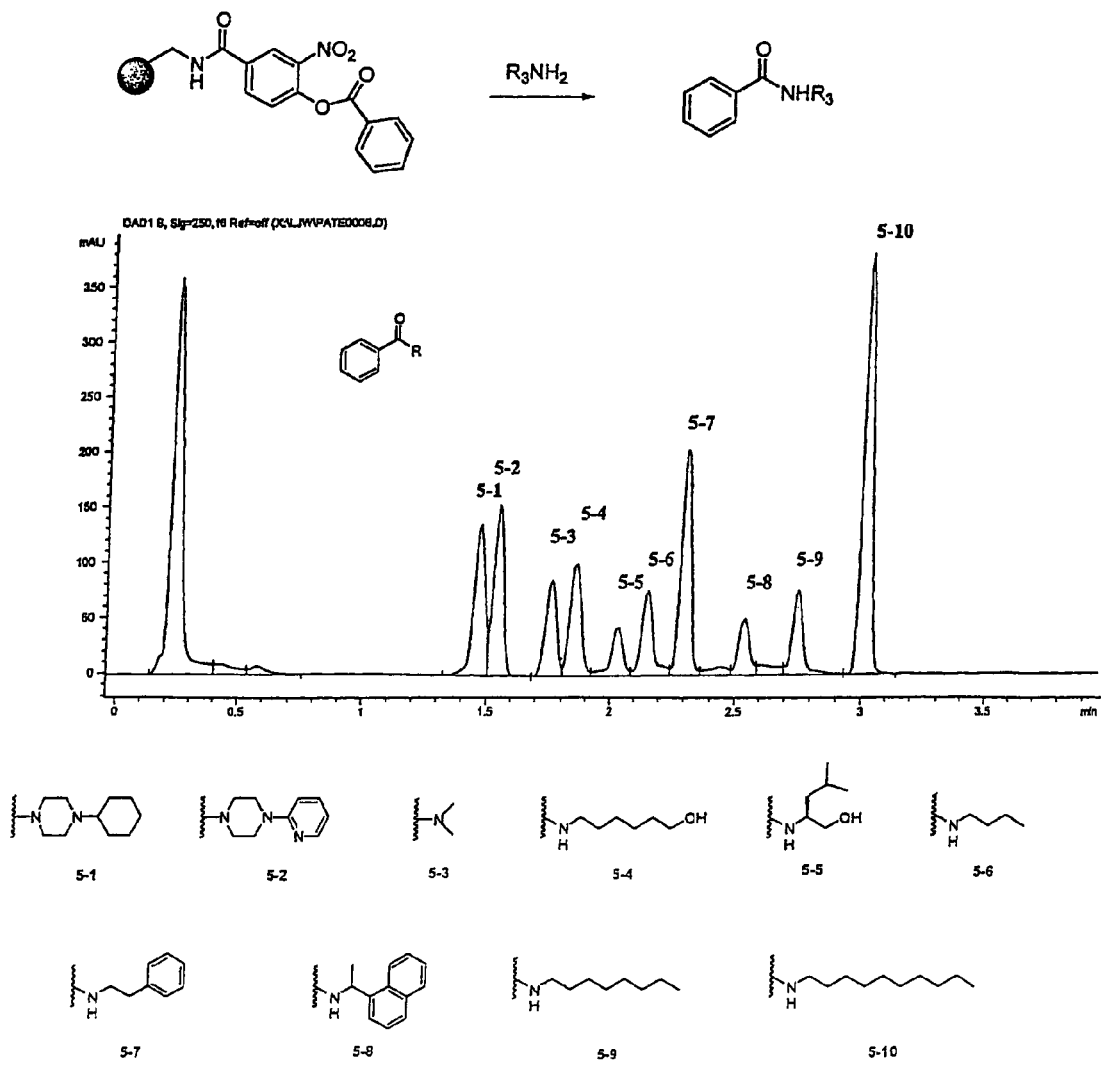

SYNTHESIS AND USE OF NITROPHENOL RESINS

CROSS REFERENCE TO RELATED APPLICATION

The present application claims priority from provisional application 60/421,568, filed Oct. 28, 2002, the entire contents of which are hereby incorporated by reference.

FIELD OF THE INVENTION

The present invention relates to methods for synthesizing nitrophenol resins on support materials and uses of these nitrophenol resins.

BACKGROUND OF THE INVENTION

After Merrifield published the first solid-phase reaction in his prominent paper (Merrifield, 1963), describing the synthesis of a peptide via attachment of amino acids to a polymer backbone, the concept became the basis for automated peptide synthesis (Cabilly, 1998). With the advent of combinatorial chemistry, there has been an explosion of attention to solid phase chemistry during the last decade, in which the scope of this technique was expanded to other fields including small molecules (Blaney et al., 2002; Jung, 1999; Dorwald, 2000; Dolle et al., 1999; Dolle, 2000; Dolle, 2001), carbohydrates (Plante et al., 2001; Kanemitsu et al., 2002), and catalysts (Copeland et al., 2001; Jarvo et al., 2001). In addition to the conventional solid phase chemistry, in which the growing compound is loaded and modified on the solid support, after which the final product is cleaved from the solid support, solid phase reagent approach is an attractive alternative method (Ley et al., 2000). In this case, the core structure of the library molecule resides in the solution, while solid phase reagents are added to cause the reaction to proceed, and are then removed from the reaction mixture by filtration.

In particular, polymeric active ester reagents are known useful tools for amide/sulfonamide library synthesis (Kim, 1999; Chang et al., 2002; Salvino et al., 2000; Hahn et al., 1998; Parlow et al., 1995;.Masala et al., 1999) and for labeling reagents (Adamczyk et al., 1999; Adamczyk et al., 1999; Katoh et al., 1999; Chang et al., 1999). Most of the reported functionalities, such as nitrophenol (Cohen, 1984), N-hydroxysuccinimide (NHS) (Adamczyk et al., 1999a; Adamczyk et al., 1999b; Katoh et al., 1999), HOBt (1-hydroxybenzotriazole) (Dendrinos. et al., 1998; Pop et al., 1997), tetrafluorophenol (TFP) (Salvino et al., 1000), and Kaiser oxime (Scialdone et al., 1998; Lumma et al., 1998), have been attached to a polystyrene resin solid support by a Feidel-Crafts reaction (Cohen et al., 1984; Scialdone et al., 1998) or to a thiol resin by a maleimide linker (Adamczyk et al., 1999a; Adamczyk et al., 1999b; Katoh et al., 1999), thus limiting the selection of resin compositions and also limiting the reaction conditions to hydrophobic organic solvents.

To overcome this limitation, the present inventors previously studied an amide bond formation of tetrafluorohydroxybenzoic acid (Salvino et al., 2000) to a variety of compositions of aminomethylresins, and successfully compared the relative kinetic behaviors (Walsh et al., 2002). A similar strategy was applied in preparing TantaGel based HOBt, NHS, and TFP, and an amide forming reaction in aqueous media was demonstrated (Corbett et al., 2002). In aqueous media, the rate of a side reaction, hydrolysis over the desired aminolysis, was dependent on the reactivity of the active ester functionality as well as other reaction conditions. While TFP was the most favorable for the aminolysis with a minimum of hydrolysis among the resins compared, it would be useful to have a variety of activated esters as a toolbox for individual applications.

SUMMARY OF THE INVENTION

It is an object of the present invention to overcome the aforesaid deficiencies in the prior art.

It is another object of the present invention to provide methods for preparing nitrophenol resins on a variety of support materials.

The nitrophenol resins of the present invention are supported on a variety of support materials as shown in FIG. 1. In FIG. 1, at least one of $R_1$, $R_2$, $R_3$, $R_4$, and $R_5$ is OH; At least one of $R_1$, $R_2$, $R_3$, $R_4$, and $R_5$ is $NO_2$. The $R_1$, $R_2$, $R_3$, $R_4$, and $R_5$ that are neither OH nor $NO_2$ are H, alkyl group, or aryl group. The circle is a solid support, such as polystyrene, Tantagel, polyethylene glycol dimethyl acrylamide copolymer, macroporous substrate, and silica gel.

The aromatic ring contains one hydroxyl group and at least one electron-withdrawing group, specifically, $NO_2$. Because of the electron-withdrawing group, the phenolic proton becomes more acidic, so that the thus formed ester is reactive to nucleophiles, especially to amines.

The synthesis process of the present invention is as follows: A new polymeric nitrophenol resin is prepared by amide bond formation between commercially available hydroxyl nitro benzoic acid and an amino-alkyl polymer support, such as polystyrene, TentaGel, polyethylene glycol dimethyl acrylamide copolymer, macroporous resin, and silica gel (Jaroniec et al., 1997; Shimizu et al., 1997), using diisopropylcarbodiimide-1-hydroxybenzotriazole) (DIC-HOBt) coupling, as shown in Scheme 1.

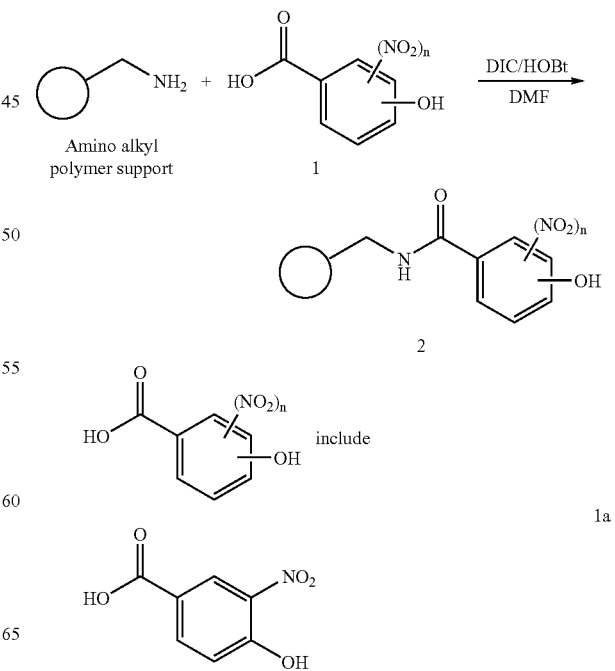

Scheme 1. Synthesis of nitrophenol resin

-continued

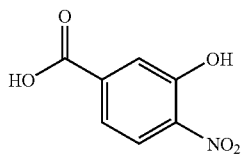

1b

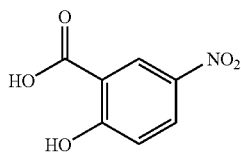

1c

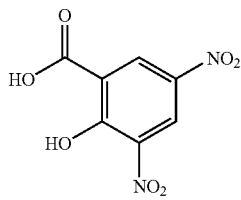

1d

Another synthetic method that can be used in the present invention involves hydrolysis of chlorobenzene, as shown in Scheme 2. 4-chloro-3-nitrobenzoyl resin was synthesized using diisopropylcarbodiimide-1-hydroxybenzotriazole) (DIC-HOBt) coupling of alkylamino resin with 4-chloro-3-nitrobenzoic acid. A subsequent basic hydrolysis produced nitrophenol resin 2a.

Scheme 2. Synthesis of nitrophenol resin by hydrolysis of chlorobenzene

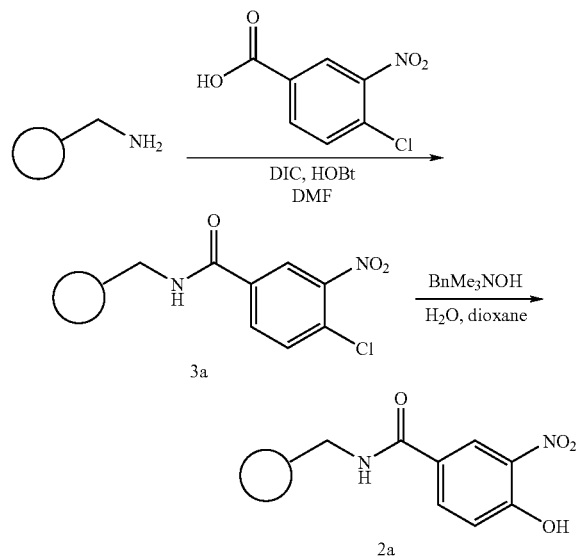

For the first step of amide synthesis, an activated ester was first formed by reacting the nitrophenol resin with acyl halide under basic conditions, or with carboxylic acids using diisopropylcarbodiimide coupling. The active ester resins were carefully rinsed to remove all traces of residual DIC, diisopropylurea, and unreacted acid. Upon addition of amine nucleophile to the resin in various organic solvents (1-methyl-2-pyrrolidinone, dimethyl sulfoxide, N,N-dimethylformamide, tetrahydrofuran, methylene chloride, ethyl acetate, etc.), the amide product was formed and released into the reaction medium, as shown in Scheme 3. The products were isolated by filtration and repeated rinsing, and the resulting product was analyzed by liquid chromatography-mass spectroscopy equipped with a UV detector and electrospray mass spectroscopy using a C18 column (20×4.0 mm) with a gradient of 5–95% $CH_3CN$—$H_2O$ (containing 0.1% acetic acid) as an eluant over four minutes.

Scheme 3. Synthesis of amide via activated ester.

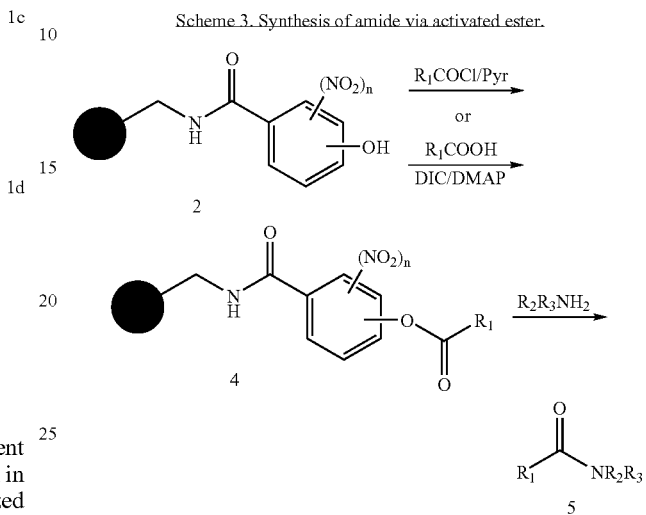

A number of esters and amides were tested, and most of the amide products were pure enough for use without further purification (>90% pure).

BRIEF DESCRIPTION OF THE DRAWINGS

FIG. 1 shows nitrophenol resins according to the present invention.

FIG. 2 is a liquid chromatography-mass spectroscopy trace of amide products using a variety of amines and benzoyl-4a.

DETAILED DESCRIPTION OF THE INVENTION

The water compatible properties of tantagel, polyethylene glycol dimethacrylamide copolymer, and silica gel resin makes it possible to conduct the amination reaction in aqueous media. Active benzoyl esters (tantagel, polyethylene glycol dimethacryalamide copolymer, silica gel) were prepared by a base catalyzed reaction with benzoyl chloride as described above. Amide couplings in aqueous solution were carried out using 0.1 M glycine in 0.1 M $NaHCO_3$ or $K_2CO_3$ condition, as shown in Scheme 4 (Corbett et al., 2002).

Scheme 4. Amide coupling in aqueous media.

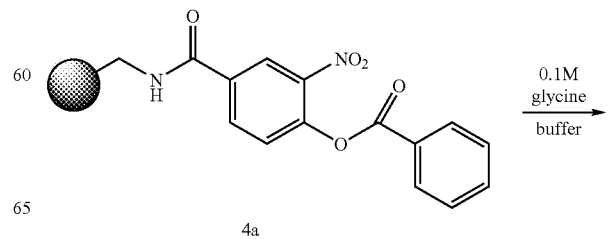

-continued

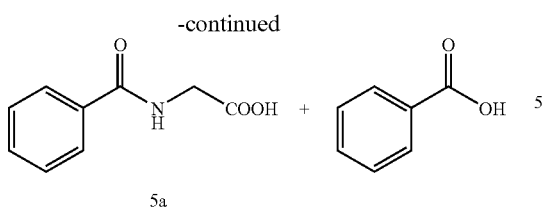

5a

The nitrophenol resin 2 is also useful in preparing sulfonamides. Sulfonyl halides were loaded onto resin 2 to form active sulfonic ester in the presence of pyridine base. The sulfonamide synthesis was performed by amine addition to resin 6a, and the resulting product was determined by liquid chromatography-mass spectroscopy.

Scheme 5. The synthesis of sulfonamide via active sulfonic acid ester.

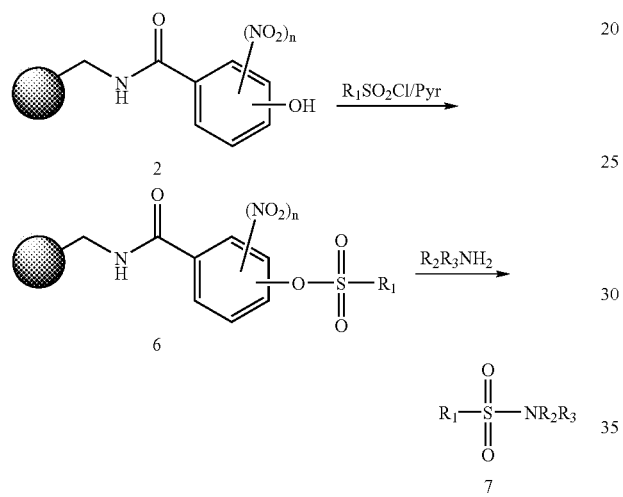

EXAMPLE 1

Coupling Procedure of Nitrophenol Resin (PS-2a)

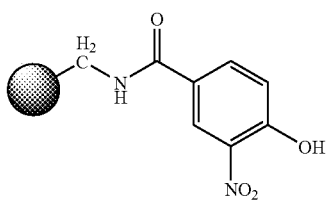

In a 50 mL polystyrene cartridge, to an amino polystyrene resin (1 g, 1.2 mmol) in DMF (15 mL) were added 4-hydroxy-3-nitrobenzoic acid (1a) (1 g, 5.46 mmol), HOBt (1 g, 7.4 mmol), and DIC (1,3-diisopropylcarbodiimide, 1 mL, 6.4 mmol). After overnight shaking, the reaction mixture was washed with DMF (20 mL, 5 times), methylene chloride, and methanol (20 mL, 5 times each). To remove any undesirable side product, DMF (5 mL) and piperidine (0.5 mL) were added to the cartridge and allowed to shake for 1.5 h. The resin was filtered and washed with DMF. The resulting piperidine salt was removed via the addition of a 10% HCl solution (in DMF, 20 mL) to the resin that was allowed to shake for 1.5 h. The mixture was then filtered, washed with DMF (20 mL, 5 times), methanol, and methylene chloride (20 mL, 5 times each) and dried by nitrogen gas flow.

EXAMPLE 2

Coupling Procedure of Nitrophenol Resin (TG-2a)

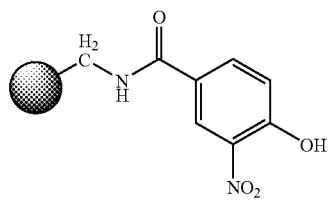

In a 50 mL polystyrene cartridge, to an amino tantagel (1 g, 0.45 mmol) in DMF (15 mL) were added 4-hydroxy-3-nitrobenzoic acid (1a) (1 g, 5.46 mmol), HOBt (1 g, 7.4 mmol), and DIC (1,3-diisopropylcarbodiimide, 1 mL, 6.4 mmol). After overnight shaking, the reaction mixture was washed with DMF (20 mL, 5 times), methylene chloride, and methanol (20 mL, 5 times each). To remove any undesirable side product, DMF (5 mL) and piperidine (0.5 mL) were added to the cartridge and allowed to shake for 1.5 h. The resin was filtered and washed with DMF. The resulting piperidine salt was removed via the addition of a 10% HCl solution (in DMF, 20 mL) to the resin that was allowed to shake for 1.5h. The mixture was then filtered, washed with DMF (20 mL, 5 times), methanol, and methylene chloride (20 mL, 5 times each) and dried by nitrogen gas flow.

EXAMPLE 3

Coupling Procedure of Nitrophenol Resin (PEGA-2a)

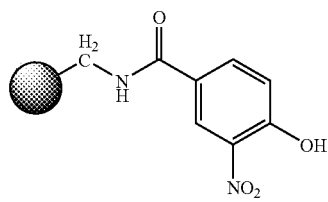

This material was prepared from 4-hydroxy-3-nitrobenzoic acid (1a) (1 g, 5.46 mmol), HOBt (1 g 7.4 mmol), DIC (1,3-diisopropylcarbodiimide, 1 mL, 6.4 mmol), an amino PEGA resin (1 g, 0.40 mmol) using a procedure similar to polystyrene resin (PS-2a).

EXAMPLE 4

Coupling Procedure of Nitrophenol Resin (MP-2a)

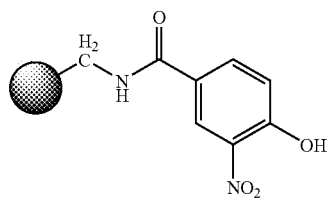

This material was prepared from 4-hydroxy-3nitrobenzoic acid (1a) (1 g, 5.46 mmol), HOBt (1 g 7.4 mmol), DIC (1,3-diisopropylcarbodiimide, 1 mL, 6.4 mmol), and a MP resin (1 g, 0.99 mmol) using a procedure similar to polystyrene resin (PS-2a).

EXAMPLE 5

Coupling Procedure of Nitrophenol Resin (PS-2b)

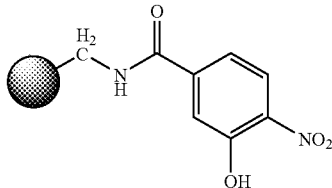

This material was prepared from 3-hydroxy-4-nitrobenzoic acid (1b) (1 g, 5.46 mmol), HOBt (1 g, 7.4 mmol), DIC (1,3-diisopropylcarbodiimide, 1 mL, 6.4 mmol), and an amino polystyrene resin (1 g, 1.2 mmol) using a procedure similar to polystyrene resin (PS-2a).

EXAMPLE 6

Coupling Procedure of Nitrophenol Resin (TG-2b)

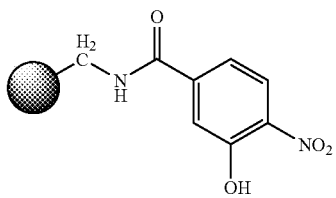

This material was prepared from 3-hydroxy-4nitrobenzoic acid (1b) (1 g, 5.46 mmol), HOBt (1 g, 7.4 mmol), DIC (1,3-diisopropylcarbodiimide, 1 mL, 6.4 mmol), and an amino tantagel resin (1 g, 0.45 mmol) using a procedure similar to polystyrene resin (PS-2a).

EXAMPLE 7

Coupling Procedure of Nitrophenol Resin (PEGA-2b)

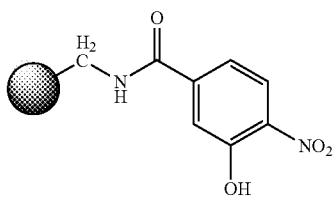

This material was prepared from 3-hydroxy-4-nitrobenzoic acid (1b) (1 g, 5.46 mmol), HOBt (1 g, 7.4 mmol), DIC (1,3-diisopropylcarbodiimide, 1 mL, 6.4 mmol), and an amino PEGA resin (1 g, 0.4 mmol) using a procedure similar to polystyrene resin (PS-2a).

EXAMPLE 8

Coupling Procedure of Nitrophenol Resin (MP-2b)

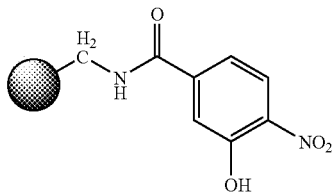

This material was prepared from 3-hydroxy-4-nitrobenzoic acid (1b) (1 g, 5.46 mmol), HOBt (1 g, 7.4 mmol), DIC (1,3-diisopropylcarbodiimide, 1 mL, 6.4 mmol), and an amino macroporous resin (1 g, 0.99 mmol) using a procedure similar to polystyrene resin (PS-2a).

EXAMPLE 9

Coupling Procedure of Nitrophenol Resin (PS-2c)

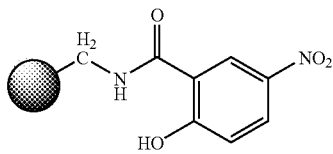

This material was prepared from 5-nitrosalicylic acid (1c) (1 g, 5.46 mmol), HOBt (1 g, 7.4 mmol), DIC (1,3-diisopropylcarbodiimide, 1 mL, 6.4 mmol), and an amino polystyrene resin (1 g, 1.2 mmol) using a procedure similar to polystyrene resin (PS-2a).

EXAMPLE 10

Coupling Procedure of Nitrophenol Resin (TG-2c)

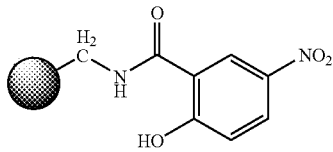

This material was prepared from 5-nitrosalicylic acid (1c) (1 g, 5.46 mmol), HOBt (1 g, 7.4 mmol), DIC (1,3-diisopropylcarbodiimide, 1 mL, 6.4 mmol), and an amino tantagel resin (1 g, 0.45 mmol) using a procedure similar to polystyrene resin (PS-2a).

EXAMPLE 11

Coupling Procedure of Nitrophenol Resin (PEGA-2c)

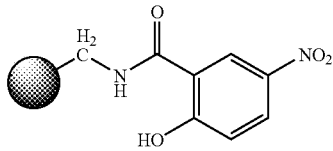

This material was prepared from 5-nitrosalicylic acid (1c) (1 g, 5.46 mmol), HOBt (1 g, 7.4 mmol), DIC (1,3-diisopropylcarodiimide, 1 mL, 6.4 mmol), and an amino PEGA resin (1 g, 0.4 mmol) using a procedure similar to polystyrene resin (PS-2a).

EXAMPLE 12

Coupling Procedure of Nitrophenol Resin (MP-2c)

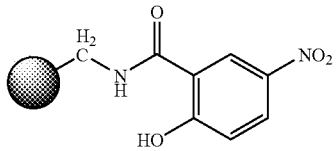

This material was prepared from 5-nitrosalicylic acid (1c) (1 g, 5.46 mmol), HOBt (1 g, 7.4 mmol), DIC (1,3-diisopropylcarodiimide, 1 mL, 6.4 mmol), and an amino macroporous resin (1 g, 0.99 mmol) using a procedure similar to polystyrene resin (PS-2a).

EXAMPLE 13

Coupling Procedure of Nitrophenol Resin (PS-2d)

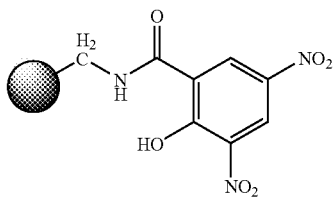

This material was prepared from 3,5-dinitrosalicylic acid (1c) (1 g, 4.4 mmol), HOBt (1 g, 7.4 mmol), DIC (1,3-diisopropylcarodiimide, 1 mL, 6.4 mmol), and an amino polystyrene resin (1 g, 1.2 mmol) using a procedure similar to polystyrene resin (PS-2a).

EXAMPLE 14

Coupling Procedure of Nitrophenol Resin (TG-2d)

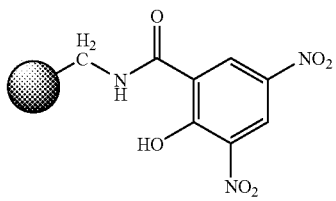

This material was prepared from 3,5-dinitrosalicylic acid (1d) (1 g, 4.4 mmol), HOBt (1 g, 7.4 mmol), DIC (1,3-diisopropylcarodiimide, 1 mL, 6.4 mmol), and an amino tantagel resin (1 g, 0.45 mmol) using a procedure similar to polystyrene resin (PS-2a).

EXAMPLE 15

Coupling Procedure of Nitrophenol Resin (PEGA-2d)

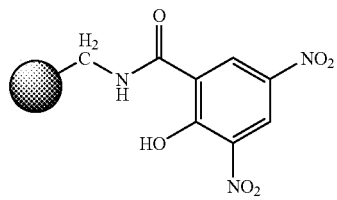

This material was prepared from 3,5-dinitrosalicylic acid (1d) (1 g, 4.4 mmol), HOBt (1 g, 7.4 mmol), DIC (1,3-diisopropylcarodiimide, 1 mL, 6.4 mmol), and an amino PEGA resin (1 g, 0.4 mmol) using a procedure similar to polystyrene resin (PS-2a).

EXAMPLE 16

Coupling Procedure of Nitrophenol Resin (MP-2d)

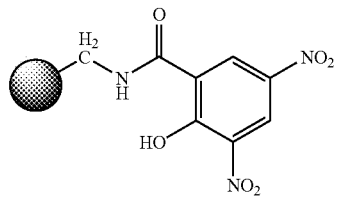

This material was prepared from 3,5-dinitrosalicylic acid (1d) (1 g, 4.4 mmol), HOBt (1 g, 7.4 mmol), DIC (1,3-diisopropylcarodiimide, 1 mL, 6.4 mmol), and an amino macroporous resin (1 g, 0.4 mmol) using a procedure similar to polystyrene resin (PS-2a).

EXAMPLE 17

Preparation of Nitrophenol Resin (PS-2a) by Hydrolysis of Chlorobenzene

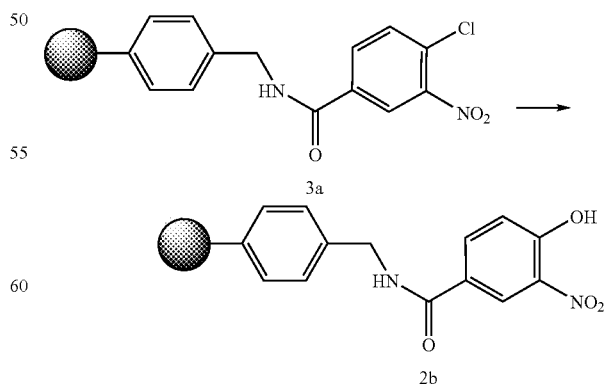

In a 250 mL round-bottom flask, to an amino resin (4 g, 4.52 mmol) in NMP (100 mL) were added 4-chloro-3- nitrobenzoic acid (2 g, 9.92 mmol), DIC (1,3-diisopropyl-carbodiimide, 2 mL, 12.8 mmol), and HOBt (2 g, 13.0 mmol). After overnight shaking, the reaction mixture was filtered and washed with dioxane. Benzyltrimethylammonium hydroxide 40% in water (50 mL), water (50 mL), and dioxane (100 mL) was added to the reaction mixture (3a). The reaction mixture was allowed to heat for 8 hours at 90° C. The resin (2b) was washed with 4 portions of warm (60° C.) dioxane, Acetic acid (30 mL) was added with stirring for 15 min. The polymer was washed with dioxane until the washings were neutral, fallowed by 6 portions of 300 mL of methylene chloride-methanol (2:1) and dried by nitrogen gas flow.

EXAMPLE 18

Preparation of Benzoyl Active Ester (PS-4a)

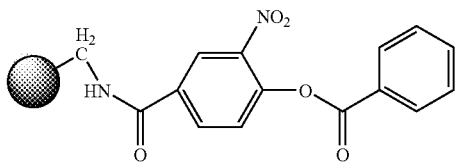

The nitrophenol resin (PS-2a) (100 mg, 0.121 mmol) was suspended in NMP (10 mL), and benzoyl chloride (0.1 mL) and pyridine (0.1 mL) were added to the reaction mixture. The reaction mixture was allowed to shake overnight. The resins were filtered and washed with DMF (10 mL, 3 times), methanol, and methylene chloride (10 mL, 5 times each) and dried by nitrogen gas flow.

EXAMPLE 19

Preparation of Benzoyl Active Ester (TG-4a)

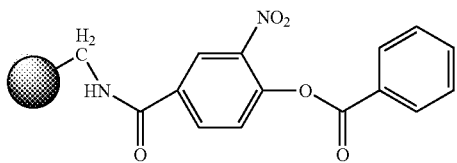

This material was prepared from nitrophenol resin (TG-2a) (100 mg, 0.045 mmol), benzoyl chloride (0.1 mL), and pyridine (0.1 mL) using a procedure similar to that for benzoyl active ester resin (PS-4a).

EXAMPLE 20

Preparation of Benzoyl Active Ester (PEGA-4a)

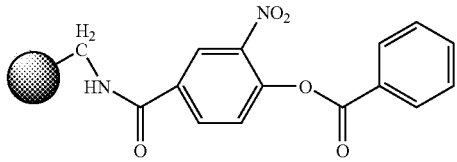

This material was prepared from nitrophenol resin (PEGA-2a) (100 mg, 0.04 mmol), benzoyl chloride (0.1 mL), and pyridine (0.1 mL) using a procedure similar to that for benzoyl active ester resin (PS-4a).

EXAMPLE 21

Preparation of Benzoyl Active Ester (MP-4a)

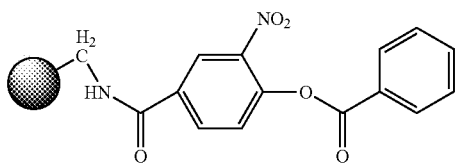

This material was prepared from nitrophenol resin (MP-2a) (100 mg, 0.09 mmol), benzoyl chloride (0.1 mL), and pyridine (0.1 mL) using a procedure similar to that for benzoyl active ester resin (PS-4a).

EXAMPLE 22

Preparation of Benzoyl Active Ester (PS-4b)

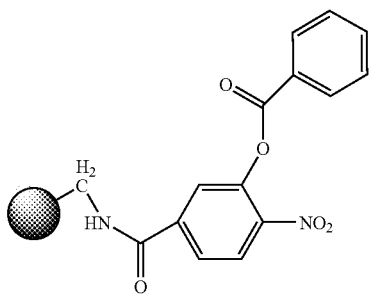

This material was prepared from nitrophenol resin (PS-2b) (100 mg, 0.121 mmol), benzoyl chloride (0.1 mL), and pyridine (0.1 mL) using a procedure similar to that for benzoyl active ester resin (PS-4a).

EXAMPLE 23

Preparation of Benzoyl Active Ester (TG-4b)

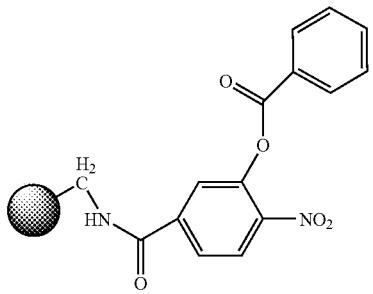

This material was prepared from nitrophenol resin (TG-2b) (100 mg, 0.045 mmol), benzoyl chloride (0.1 mL), and pyridine (0.1 mL) using a procedure similar to that for benzoyl active ester resin (PS-4a).

EXAMPLE 24

Preparation of Benzoyl Active Ester (PEGA-4b)

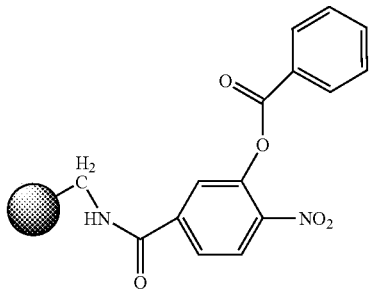

This material was prepared from nitrophenol resin (PEGA-2b) (100 mg, 0.04 mmol), benzoyl chloride (0.1 mL), and pyridine. (0.1 mL) using a procedure similar to that for benzoyl active ester resin (PS-4a).

EXAMPLE 25

Preparation of Benzoyl Active Ester (MP-4b)

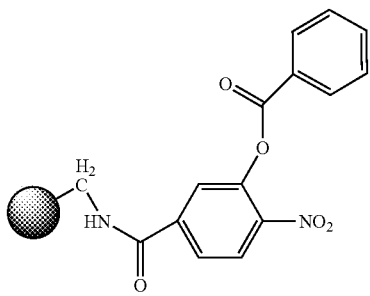

This material was prepared from nitrophenol resin (MP-2b) (100 mg, 0.09 mmol), benzoyl chloride (0.1 mL), and pyridine (0.1 mL) using a procedure similar to that for benzoyl active ester resin (PS-4a).

EXAMPLE 26

Preparation of Benzoyl Active Ester (PS-4c)

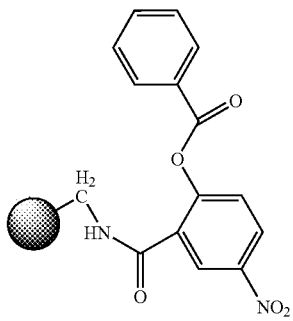

This material was prepared from nitrophenol resin (PS-2c) (100 mg, 0.121 mmol), benzoyl chloride (0.1 mL), and pyridine (0.1 mL) using a procedure similar to that for benzoyl active ester resin PS-4a.

EXAMPLE 27

Preparation of Benzoyl Active Ester (TG-4c)

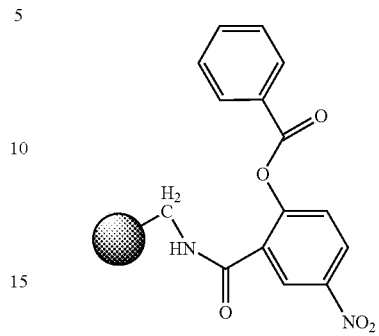

This material was. prepared from nitrophenol resin. (TG-2c) (100 mg, 0.045 mmol), benzoyl chloride (0.1 mL), and pyridine (0.1 mL) using a procedure similar to that for benzoyl active ester resin (PS-4a).

EXAMPLE 28

Preparation of Benzoyl Active Ester (PEGA-4c)

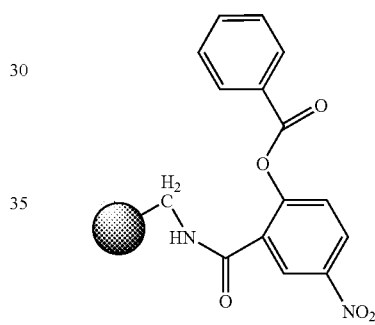

This material was prepared from nitrophenol resin (PEGA-2c) (100 mg, 0.04 mmol), benzoyl chloride (0.1 mL), and pyridine (0.1 mL) using a procedure similar to that for benzoyl active ester resin (PS-4a).

EXAMPLE 29

Preparation of Benzoyl Active Ester (MP-4c)

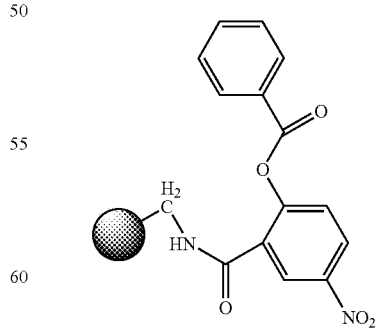

This material was prepared from nitrophenol resin (MP-2c) (100 mg, 0.09 mmol), benzoyl chloride (0.1 mL), and pyridine (0.1 mL) using a procedure similar to that for benzoyl active ester resin (PS-4a).

EXAMPLE 30

Preparation of Benzoyl Active Ester (PS-4*d*)

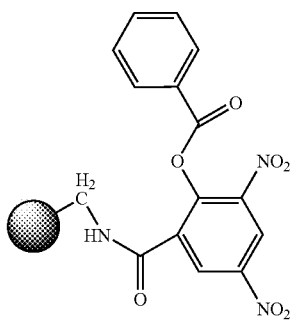

This material was prepared from nitrophenol resin (PS-2*d*) (100 mg, 0.121 mmol), benzoyl chloride (0.1 mL), and pyridine (0.1 mL) using a procedure similar to that for benzoyl active ester resin (PS-4*a*).

EXAMPLE 31

Preparation of Benzoyl Active Ester (TG-4*d*)

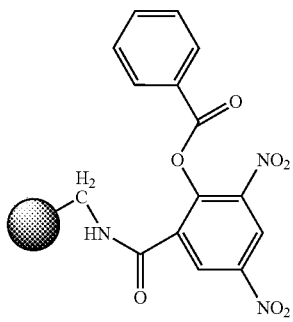

This material was prepared from nitrophenol resin (TG-2*d*) (100 mg, 0.045 mmol), benzoyl chloride (0.1 mL), and pyridine (0.1 mL) using a procedure similar to that for benzoyl active ester resin PS-4*a*.

EXAMPLE 32

Preparation of Benzoyl Active Ester (PEGA-4*d*)

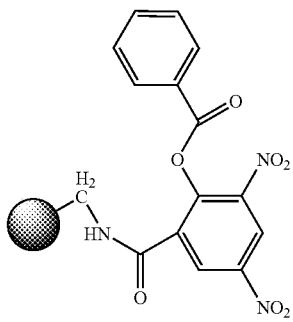

This material was prepared from nitrophenol resin (PEGA-2*d*) (100 mg, 0.04 mmol), benzoyl chloride (0.1 mL), and pyridine (0.1 mL) using a procedure similar to that for benzoyl active ester resin (PS-4*a*).

EXAMPLE 33

Preparation of Benzoyl Active Ester (MP-4*d*)

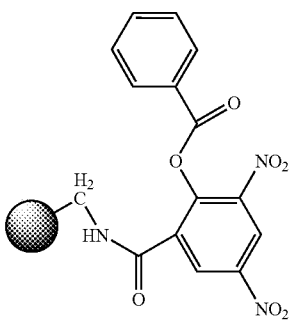

This material was prepared from nitrophenol resin (MP-2*d*) (100 mg, 0.09 mmol), benzoyl chloride (0.1 mL), and pyridine (0.1 mL) using a procedure similar to that for benzoyl active ester resin (PS-4*a*).

EXAMPLE 34

Preparation of 4-chlorobutyryl active ester

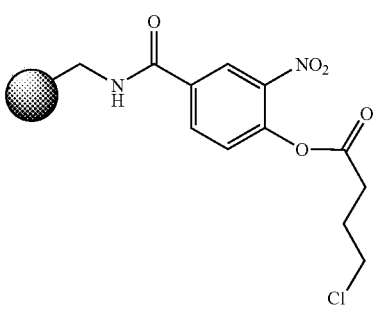

To a mixture of nitrophenol resin (PS-2*a*) (80 mg, 0.07 mmol) in NMP (1 mL) was added 4-chlorobutyryl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 35

Preparation of Propionyl Active Ester

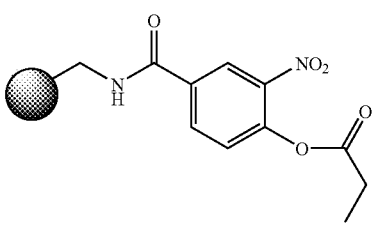

To a mixture of nitrophenol resin (PS-2*a*) (80 mg, 0.07 mmol) in NMP (1 mL) was added propionyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 36

Preparation of 3-mtheyl Butyryl Active Ester

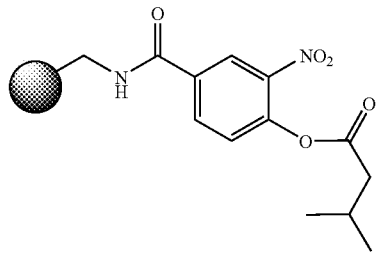

To a mixture of nitrophenol resin (PS-2*a*) (80 mg, 0.07 mmol) in NMP (1 mL) was added 3-methyl butyryl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 37

Preparation of Hexanoyl Active Ester

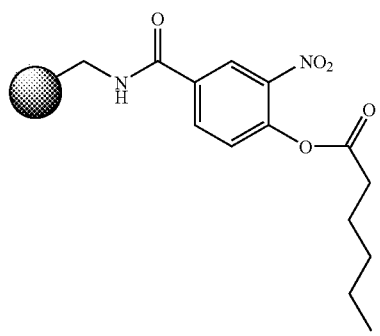

To a mixture of nitrophenol resin (PS-2*a*) (80 mg, 0.07 mmol) in NMP (1 mL) was added hexanoyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 38

Preparation of Pentanoyl Active Ester

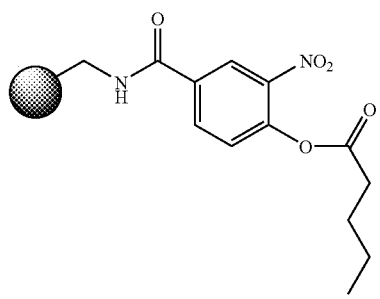

To a mixture of nitrophenol resin (PS-2*a*) (80 mg, 0.07 mmol) in NMP (1 mL) was added pentanoyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 39

Preparation of Phenylacetyl Active Ester

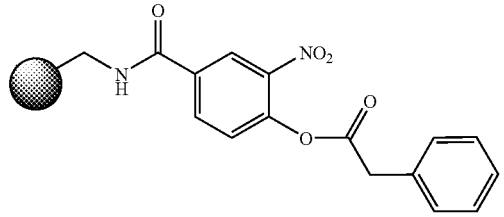

To a mixture of nitrophenol resin (PS-2*a*) (80 mg, 0.07 mmol) in NMP (1 mL) was added phenylacetyl chloride (4.5 eq) and pyridine (0.1 mL). The reaction mixture was allowed to stir overnight. The resin was filtered and washed with DMF (5 mL, 5 times each), methylene chloride and methanol (5 mL, 5 times each), and dried by nitrogen gas flow.

EXAMPLE 40

Preparation of 3-Phenylpropionyl Active Ester

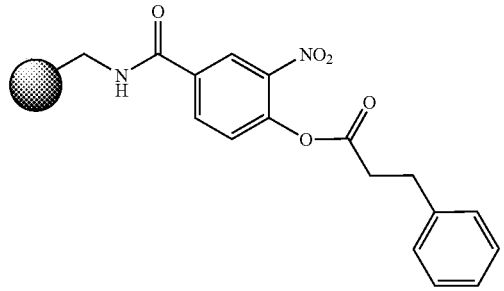

To a mixture of nitrophenol resin (PS-2*a*) (80 mg, 0.07 mmol) in NMP (1 mL) was added 3-phenylpropionyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 41

Preparation of Adamantane-1-carbonyl Active Ester

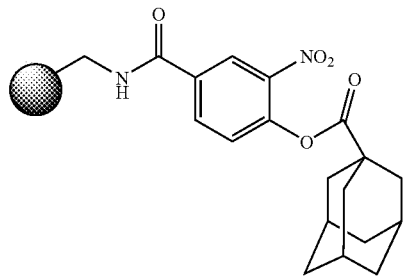

To a mixture of nitrophenol resin (PS-2a) (80 mg, 0.07 mmol) in NMP (1 mL) was added adamantine-1-carbonyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 42

Preparation of 4-Fluorophenyl Acetyl Active Ester

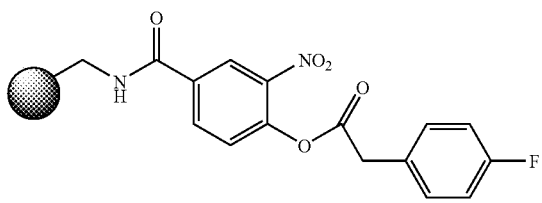

To a mixture of nitrophenol resin (PS-2a) (80 mg, 0.07 mmol) in NMP (1 mL) was added 4-fluorophenylacetyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 43

Preparation of 4-Methoxyphenyl Acetyl Active Ester

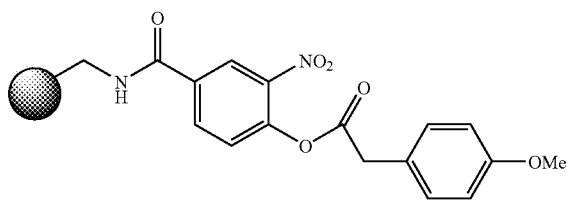

To a mixture of nitrophenol resin (PS-2a) (80 mg, 0.07 mmol) in NMP (1 mL) was added 4-methoxyphenylacetyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 44

Preparation of 4-Chlorophenyl Acetyl Active Ester

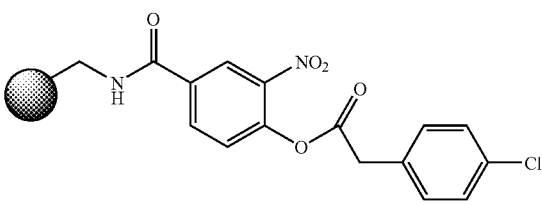

To a mixture of nitrophenol resin (PS-2a) (80 mg, 0.07 mmol) in NMP (1 mL) was added 4-chlorophenylacetyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 45

Preparation of 3-Cyclopenty Propionyl Active Ester

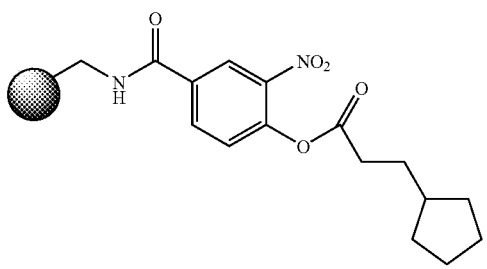

To a mixture of nitrophenol resin (PS-2a) (80 mg, 0.07 mmol) in NMP (1 mL) was added 3-cyclopentylpropionyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 46

Preparation of 4-Chlorobenzoyl Active Ester

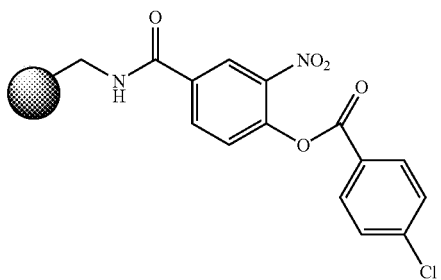

To a mixture of nitrophenol resin (PS-2a) (80 mg, 0.07 mmol) in NMP (1 mL) was added 4-chlorobenzoyl chloride (4.5 eq) and pyridine (0.1 mL). The reaction mixture was allowed to stir overnight. The resin was filtered and washed with DMF (5 mL, 5 times), methylene chloride and methanol (5 mL, 5 times each), and dried by nitrogen gas flow.

EXAMPLE 47

Preparation of N-pyridin-2-ylmethyl Benzamide

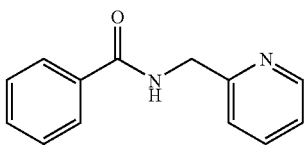

The mixture of benzoyl active ester resin (example 18) (40 mg) in THF (1 mL) was treated with 2-(aminomethyl) pyridine 0.3 μL. The reaction mixture was stirred at room temperature overnight.

EI-MS m/z 213.1 [M+H]$^+$. LC$_{area}$ (UV$_{250}$)=99% LC$_{retention\ time}$ (UV$_{250}$)=1.51

EXAMPLE 48

Preparation of 4-Chloro-N-pyridin-2-ylmethyl Butyramide

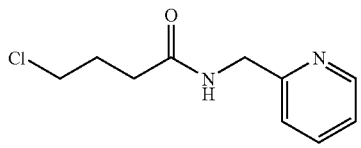

This material was prepared from 4-chlorobutyryl active ester resin (example 34) using a procedure similar to N-pyridin-2-ylmethyl benzamide.

EI-MS m/z 213.1 [M+H]$^+$. LC$_{area}$ (UV$_{250}$)=89.6% LC$_{retention\ time}$ (UV$_{250}$)=0.74

EXAMPLE 49

Preparation of N-pyridin-2-ylmethyl Propionamide

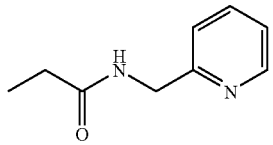

This material was prepared from propionyl active ester resin (example 35) resin using a procedure similar to N-pyridin-2-ylmethyl benzamide.

EI-MS m/z 165.1 [M+H]$^+$. LC$_{area}$ (UV$_{250}$)=95.6% LC$_{retention\ time}$ (UV$_{250}$)=0.23

EXAMPLE 50

Preparation of 3-Methyl-N-pyridin-2-ylmethyl Butyramide

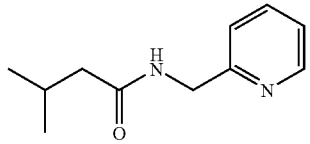

This material was prepared from 3-methylbutyryl active ester resin (example 36) using a procedure similar to N-pyridin-2-ylmethyl benzamide.

EI-MS m/z 193.1 [M+H]$^+$. LC$_{area}$ (UV$_{250}$)=95% LC$_{retention\ time}$ (UV$_{250}$)=1.37

EXAMPLE 51

Preparation of Hexanoic Acid Pyridin-2-ylmethyl Amide

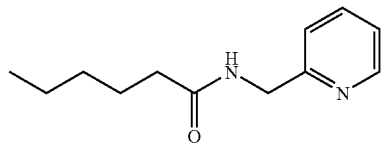

This material was prepared from n-hexanoyl active ester resin (example 37) using a procedure similar to N-pyridin-2-ylmethyl benzamide.

EI-MS m/z 207.2 [M+H]$^+$. LC$_{area}$ (UV$_{250}$)=93% LC$_{retention\ time}$ (UV$_{250}$)=1.71

EXAMPLE 51

Preparation of Pentanoic Acid Pyridin-2-ylmethyl Amide

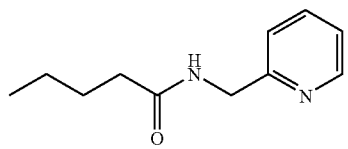

This material was prepared from n-pentanoyl active ester resin (example 38) using a procedure similar to N-pyridin-2-ylmethyl benzamide.

EI-MS m/z 193.1 [M+H]$^+$. LC$_{area}$ (UV$_{250}$)=94.5% LC$_{retention\ time}$ (UV$_{250}$)=1.43

EXAMPLE 52

Preparation of 2-Phenyl pyridin-2-ylmethyl-acetamide

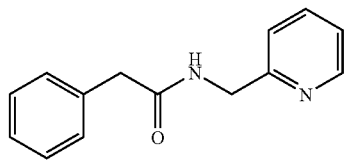

This material was prepared from 2-phenylacetyl active ester resin (example 39) using a procedure similar to N-pyridin-2-ylmethyl benzamide.

EI-MS m/z 227.1 [M+H]$^+$. LC$_{area}$ (UV$_{250}$)=60% LC$_{retention\ time}$ (UV$_{250}$)=1.61

EXAMPLE 52

Preparation of 3-Phenyl Pyridin-2-ylmethyl-propionamide

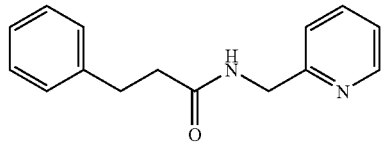

This material was prepared from 3-pheny propionyl active ester resin (example 40) using a procedure similar to N-pyridin-2-ylmethyl benzamide.

EI-MS m/z 241.1 [M+H]$^+$. LC$_{area}$ (UV$_{250}$)=92.4% LC$_{retention\ time}$ (UV$_{250}$)=1.72

EXAMPLE 53

Preparation of adamantane-1-carboxyl acid pyridin-2-ylmethylamide

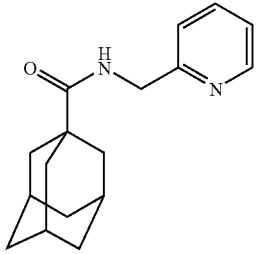

This material was prepared from adamantine-1-carboyl active ester resin (example 41) using a procedure similar to N-pyridin-2-ylmethyl benzamide.

EI-MS m/z 271.2 [M+H]$^+$. LC$_{area}$ (UV$_{250}$)=97% LC$_{retentin\ time}$ (UV$_{250}$)=2.05

EXAMPLE 54

Preparation of N-benzyl-2-(4-fluorophenyl)-acetamide

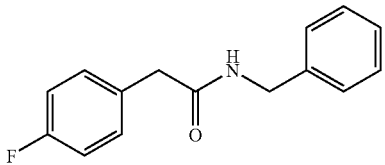

This material was prepared from 4-fluorophenylacetyl active ester resin (example 42) using a procedure similar to N-pyridin-2-ylmethyl benzamide.

EI-MS m/z 245.1 [M+H]$^+$. LC$_{area}$ (UV$_{250}$)=70% LC$_{retention\ time}$ (UV$_{250}$)=1.67

EXAMPLE 54

Preparation of N-benzyl-2-(4-methoxyphenyl)-acetamide

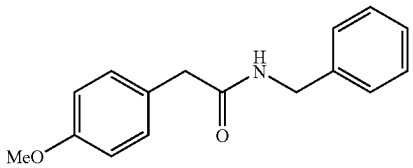

This material was prepared from 4-methoxyphenylacetyl active ester resin (example 43) using a procedure similar to N-pyridin-2-ylmethyl benzamide.

EI-MS m/z 245.1 [M+H]$^+$. LC$_{area}$ (UV$_{250}$)=70% LC$_{retention\ time}$ (UV$_{250}$)=1.67

EXAMPLE 55

Preparation of N-benzyl-2-(4-chlorophenyl)-acetamide

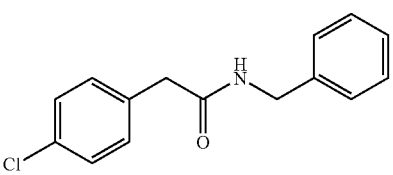

This material was prepared from 4-chlorophenylacetyl active ester resin (example 44) using a procedure similar to N-pyridin-2-ylmethyl benzamide.

EI-MS m/z 261.1 [M+H]$^+$. LC$_{area}$ (UV$_{250}$)=80% LC$_{retention\ time}$ (UV$_{250}$)=1.83

EXAMPLE 56

Preparation of N-benzyl-2-(cyclopenty)-propionamide

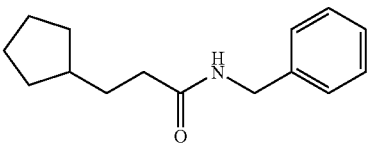

This material was prepared from cyclopentypropionyl active ester resin (example 45) using a procedure similar to N-pyridin-2-ylmethyl benzamide.

EI-MS m/z 233.1 [M+H]$^+$. LC$_{area}$ (UV$_{250}$)=97% LC$_{retention\ time}$ (UV$_{250}$)=1.91

EXAMPLE 57

Preparation of N-benzyl-2-chlorobenzamide

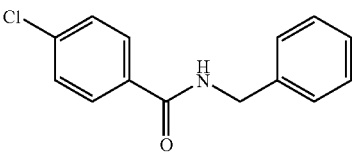

This material was prepared from 2-chlorobenzoyl active ester resin (example 46) using a procedure similar to N-pyridin-2-ylmethyl benzamide.

EI-MS m/z 247.0 [M+H]$^+$. LC$_{area}$ (UV$_{250}$)=99% LC$_{retention\ time}$ (UV$_{250}$)=1.84

EXAMPLE 58

Preparation of Benzoylaminoacetic Acid

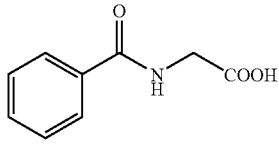

To a nitrophenol resin (TG-2a) (10 mg, 3.5 μmol) was added 0.1 M glycin in 0.1 M NaHCO$_3$. The reaction was stirred for 18 hours. The reaction mixture was filtered and washed with H$_2$O. The washer was combined and acidified with acetic acid.

EI-MS m/z 180.0 [M+H]$^+$ LC$_{area}$ (UV$_{230}$)=95% LC$_{retention\ time}$ (UV$_{230}$)=1.55

EXAMPLE 59

Preparation of Benzoylaminoacetic Acid

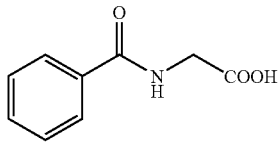

To a nitrophenol resin (TG-2a) (10 mg, 3.5 μmol) was added 0.1 M glycin in 0.1 M K$_2$CO$_3$. The reaction was stirred for 18 hours. The reaction mixture was filtered and washed with H$_2$O. The washer was combined and acidified with acetic acid.

EI-MS m/z 180.0 [M+H]$^+$ LC$_{area}$ (UV$_{230}$)=96% LC$_{retention\ time}$ (UV$_{230}$)=1.50

EXAMPLE 60

Preparation of Aminopropyl Silica Gel

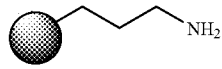

Aminopropyl Silica Gel

A silica gel (1 g) in toluene (10 mL) was refluxed with aminopropyltriethoxysilane (1.2 mL). The reaction mixture was refluxed for 6 hours with stirring. The reaction mixture was filtered using 3 mL filter cartridges, washed thoroughly with methanol and methylene chloride. It was the dried by blowing nitrogen gas. [32,33]

EXAMPLE 61

Preparation of 4-hydroxyl Nitrobenzamidopropyl Silica Gel (SG-2a)

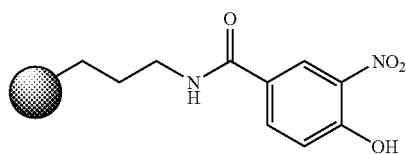

In 100 mL round-bottom flask, to aminopropyl silica gel (1 g) in NMP (10 mL) was added 4-hydroxyl-3-nitrobenzoic acid (2 g, 10.9 mmol). HOBt (2 g, 14.8 mmol) and DIC (1,3-diisopropylcarbodiimide, 2 mL, 12.8 mmol) were added to the reaction mixture. The reaction mixture was allowed to stir overnight, followed by filtering. It was washed with DMF (10 mL, 5 times), methylene chloride, and methanol (10 mL, 5 times each). The amino silica gel was washed with piperidine (0.2 mL) in THF (2 mL) and shaken for 10 min. The silica gel was filtered and washed with DMF (10 mL, 5 times) and MC (10 mL, 5 times). The silica gel was dried with a nitrogen gas flow.

EXAMPLE 62

Preparation of Active Ester (SG-4a)

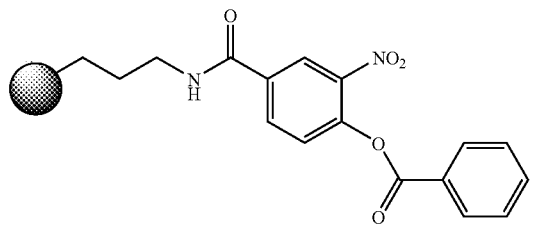

The silica-gel resin (example 61) (1 g) was stirred with benzoyl chloride (1 mL, 8.53 mmol) in a 1:10 solution of pyridine: MC (10 mL). After 1 hour stirring, the resin was filtered, washed with THF (10 mL, 5 times) and MC (10 mL, 5 times), and dried by nitrogen flow.

EXAMPLE 63

Preparation of Various Kinds of Amides from Benzoyl Active Ester

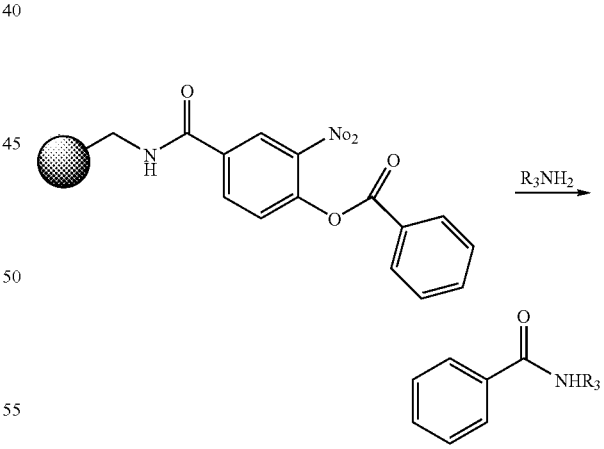

R$_3$ include

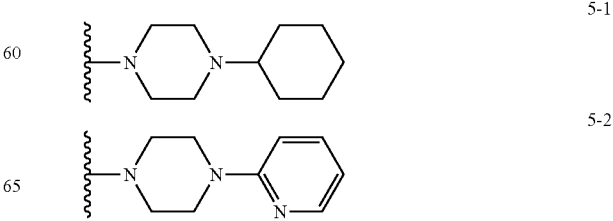

5-1

5-2

-continued

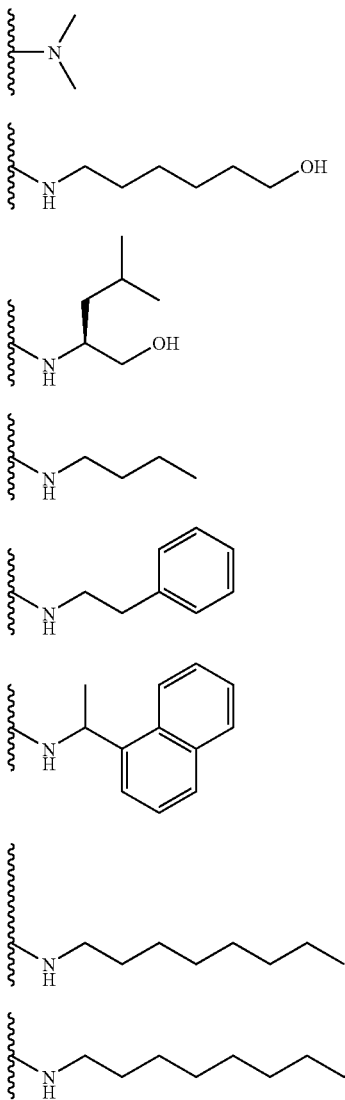

5-3

5-4

5-5

5-6

5-7

5-8

5-9

5-10

A benzoyl active ester resin (PS-4a, TG-4a, PEGA-74a, MP-4a, or SG-4a, 50 mg, 75 μmol) was added to 10 kinds of amine (0.3 μmol) in THF (1 mL) and agitated on a rocker overnight at room temperature. The reaction mixture was filtered and washed with a portion of THF (1 mL), and the filtrates were combined and dried. Completion of the reaction was confirmed by TLC with ninhydrin staining and analyzed by LC-MS A1 EI-MS m/z 273.1 $[M+H]^+$ $LC_{retention\ time}$ $(UV_{250})$=1.41

A2 EI-MS m/z 268.1 $[M+H]^+$ $LC_{retention\ time}$ $(UV_{250})$=1.54

A3 EI-MS m/z 172.1 $[M+Na]^+$ $LC_{retention\ time}$ $(UV_{250})$=1.75

A4 EI-MS m/z 244.1 $[M+Na]^+$ $LC_{retention\ time}$ $(UV_{250})$=1.85

A5 EI-MS m/z 244.1 $[M+Na]^+$ $LC_{retention\ time}$ $(UV_{250})$=2.03

A6 EI-MS m/z 200.1 $[M+Na]^+$ $LC_{retention\ time}$ $(UV_{250})$=2.15

A7 EI-MS m/z 248.1 $[M+Na]^+$ $LC_{retention\ time}$ $(UV_{250})$=2.28

A8 EI-MS m/z 298.1 $[M+Na]^+$ $LC_{retention\ time}$ $(UV_{250})$=2.54

A9 EI-MS m/z 256.1 $[M+Na]^+$ $LC_{retention\ time}$ $(UV_{250})$=2.75

A10 EI-MS m/z 284.1 $[M+Na]^+$ $LC_{retention\ time}$ $(UV_{250})$=3.01

EXAMPLE 64

Preparation of Sulfonic Acid Active Ester Resin (PS-6a)

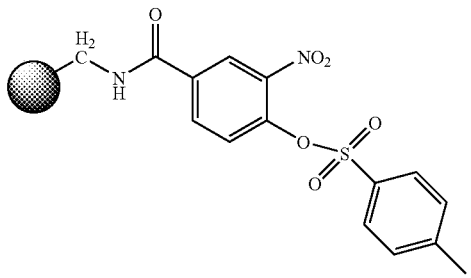

A nitrophenol resin 2a (1 g, 2.2 mmol) was added to a 100 mL polypropylene reaction vessel. The resin was swelled with THF (20 mL) for 10 min with mild agitation. Pyridine (1 mL) was added to the reaction. A p-toluenesulfonyl chloride (1.2 mg, 6.3 mmol) was added to the resin mixture and agitated vigorously until all of the sulfonyl chloride dissolved. The polypropylene reaction vessel was capped and gently agitated for 16 hours at room temperature. The reaction mixture was filtered and washed with DMF (10 mL, 5 times), MC and methanol (10 mL, 5 times each) and dried by nitrogen gas flow.

EXAMPLE 65

Preparation of p-toluenesulfonyl-4-piperidine

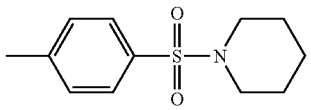

A p-toluenesulfonyl active ester resin (50 mg, 0.055 mmol) was added to a 10 mL polypropylene reaction vessel. The resin was swelled in THF (1 mL) for 10 min. piperidine (3.7 mg, 0.044 mmol) was added and the mixture was filtered, then washed with MC. The filtrates were combined and evaporated.

EI-MS m/z 262.1 $[M+Na]^+$ $LC_{area}$ $(UV_{230})$=95% $LC_{retention\ time}$ $(UV_{230})$=2.58

EXAMPLE 66

Preparation of p-toluenesulfonyl-4-cyclohexylpiperazine

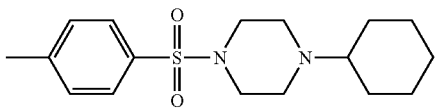

A p-toluenesulfonyl active ester resin (50 mg, 0.055 mmol) was added to a 10 mL polypropylene reaction vessel.

The resin was swelled in THF (1 mL) for 10 min. 1-cyclohexylpiperazine (7.4 mg, 0.044 mmol) was added and the mixture was filtered, and then washed with MC. The filtrates were combined and evaporated.

EI-MS m/z 323.2 [M+H]$^+$ LC$_{area}$ (UV$_{230}$)=99% LC$_{retention\ time}$ (UV$_{230}$)=1.63

EXAMPLE 67

Preparation of
p-toluenesulfonyl-4-(2-pyridyl)-piperazine

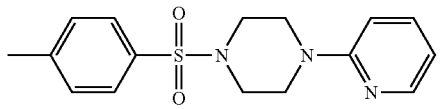

A p-toluenesulfonyl active ester resin (50 mg, 0.055 mmol) was added to a 10 mL polypropylene reaction vessel. The resin was swelled in THF (1 mL) for 10 min. 2-pyridyl-piperazine (7.2 mg, 0.044 mmol) was added and the mixture was filtered, and then washed with MC. The filtrates were combined and evaporated.

EI-MS m/z 318.1 [M+H]$^+$ LC$_{area}$ (UV$_{230}$)=99% LC$_{retention\ time}$ (UV$_{230}$)=2.12

For the nitrophenols of the present invention, the OH and the NO$_2$ groups can be at any position on the benzene ring.

As used herein, alkyl carbon chains, if not specified, contain from 1 to 20 carbon atoms, preferably from 1 to 16 carbon atoms, and are straight or branched.

The alkyl groups may be optionally substituted, with one or more groups, preferably alkyl group substituents that may be the same or different. As used herein, lower alkyl, refers to carbon chains having fewer than or equal to about 6 carbon atoms.

As used herein an alkyl group substituent includes halo, haloalkyl, preferably halo lower alkyl, aryl, hydroxy, alkoxy, aryloxy, alkoxy, alkylthio, arylthio, aralkyloxy, aralkylthio, carboxy, alkoxycarbonyl, oxo, and cycloalkyl.

The term "aryl" herein refers to aromatic cyclic compounds having up to 10 atoms, including carbon atoms, oxygen atoms, sulfur atoms, selenium atoms, etc. Aryl groups include, but are not limited to, groups such as phenyl, substituted phenyl, naphthyl, substituted naphthyl, in which the substituent is preferably lower alkyl, halogen, or lower alkyl. "Aryl" may also refer to fused rings systems having aromatic unsaturation. The fused ring systems can contain up to about 7 rings.

An "aryl group substituent" as used herein includes alkyl, cycloalkyl, cycloaryl, aryl, heteroaryl, optionally substituted with 1 or more, preferably 1 to 3, substituents selected from halo, haloalkyl, and alkyl, arylalkyl, heteroarylalkyl, alkenyl containing 1 to 2 double bonds, alkynyl containing 1 to 2 triple bonds, halo, hydroxy, polyhaloalkyl, preferably trifluoromethyl, formyl, alkylcarbonyl, arylcarbonyl, optionally substituted with 1 or more, preferably 1 to 3, substituents selected from halo, haloalkyl, alkyl, heteroarylcarbonyl, carboxyl, alkoxycarbonyl, aryloxycarbonyl, aminocarbonyl, alkylaminocarbonyl, dialkylaminocarbonyl, arylalkylaminocarbonyl, alkoxy, aryloxy, perfluoroalkoxy, alkenyloxy, alkynyloxy, arylalkoxy, aminoalkyl, alkylaminoalkyl, dialkylaminoalkyl, arylaminoalkyl, amino, alkylamino, dialkylamino, arylamino, alkylarylamino, alkylcarbonylamino, arylcarbonylamino, amido, nitro, mercapto, alkylthio, arylthio, perfluoroalkylthio, thiocyano, isothiocyano, alkylsufinyl, alkylsulfonyl, arylsulfinyl, arylsulfonyl, aminosulfonyl, alkylaminosulfinyl, dialkylaminosulfonyl, and arylaminosulfonyl.

The term "arylalkyl" as used herein refers to an alkyl group which is substituted with one or more aryl groups. Examples of arylalkyl groups include benzyl, 9-fluorenylmethyl, naphthylmethyl, diphenylmethyl, and triphenylmethyl.

"Cycloalkyl" as used herein refers to a saturated mono- or multicyclic ring system, preferably of 3 to 10 carbon atoms, more preferably from 3 to 6 carbon atoms. Cycloalkenyl and cycloalkynyl refer to mono- or multicyclic ring systems that respectively include at least one double bond and at least one triple bond. Cycloalkenyl and cycloalkynyl groups may preferably contain 3 to 10 carbon atoms, with cycloalkenyl groups more preferably containing 4 to 7 carbon atoms and cycloalkynyl groups more preferably containing 8 to 10 carbon atoms. The ring systems of the cycloalkyl, cycloalkenyl and cycloalkynyl groups may be composed of one ring or two or more rings which may be joined together in a fused, bridged, or spiro-connected fashion, and may be optionally substituted with one or more alkyl group substituents.

The term "heteroaryl" for purposes of the present application refers to a monocyclic or multicyclic ring system, preferably about 5 to about 15 members, in which at least one atom, preferably 1 to 3 atoms, is a heteroatom, that is, an element other than carbon, including nitrogen, oxygen, or sulfur atoms. The heteroaryl may be optionally substituted with one or more, preferably 1 to 3, aryl group substituents. Exemplary heteroaryl groups include, for example, furanyl, thienyl, pyridyl, pyrrolyl, N-methylpyrrolyl, quinolyinyl and isoquinolinyl.

The term "heterocyclic" refers to a monocyclic or multicyclic ring system, preferably of 3 to 10 members, more preferably 4 to 7 members, where one or more, preferably 1 to 3, of the atoms in the ring system is a heteroatom, i.e., an atom that is other than carbon, such as nitrogen, oxygen, or sulfur. The heterocycle may be optionally substituted with one or more, preferably 1 to 3, aryl group substituents. Preferred substituents of the heterocyclic group include hydroxy, alkoxy, halo lower alkyl. The term heterocyclic may include heteroaryl. Exemplary heterocyclics include, for example, pyrrolidinyl, piperidinyl, alkylpiperidinyl, morpholinyl, oxadiazolyl, or triazolyl.

The nomenclature alkyl, alkoxy, carbonyl, etc, is used as is generally understood by those of skilled this art. As used herein, alkyl refers to saturated carbon chains that contain one or more carbon atoms; the chains may be straight or branched or include cyclic portions or may be cyclic.

The term "halogen" or "halide" includes F, Cl, Br, and I. This can include pseudohalides, which are anions that behave substantially similarly to halides. These compounds can be used in the same manner and treated in the same manner as halides. Pseudohalides include, but are not limited to, cyanide, cyanate, thiocyanate, selenocyanate, trifluoromethyl, and azide.

The term "haloalkyl" refers to a lower alkyl radical in which one or more of the hydrogen atoms are replaced by halogen, including but not limited to, chloromethyl, trifluoromethyl, 1-chloro-2-fluoroethyl, and the like. "Haloalkoxy" refers to RO— in which R is a haloalkyl group.

The term "sulfinyl" refers to —S(O)—. "sulfonyl" refers to —S(O)$_2$—.

"Aminocarbonyl" refers to —C(O)NH$_2$.

The term "arylene" as used herein refers to a monocyclic or polycyclic bivalent aromatic group preferably having from 1 to 20 carbon atoms and at least one aromatic ring. The arylene group is optionally substituted with one or more alkyl group substituents. There may be optionally inserted around the arylene group one or more oxygen, sulfur, or substituted or unsubstitued nitrogen atoms, where the nitrogen substituent is alkyl.

"Heteroarylene" refers to a bivalent monocyclic or multicyclic ring system, preferably of about 5 to about 15 members, wherein one or more of the atoms in the ring system is a heteroatom. The heteroarylene may be optionally substituted with one or more aryl group substituents. As used herein, "alkylidene" refers to a bivalent group, such as =CR'R", which is attached to one atom of another group, forming a double bond. "Arylalkylidene" refers to an alkylidene group in which either R' or R" is an aryl group.

As used herein, when any particular group, such as phenyl or pyridyl, is specified, this means that the group is substituted or unsubstituted. Preferred substituents, where not specified, are halo, halo lower alkyl, and lower alkyl.

Thus, according to the present invention, new polymer-bound nitrophenol resins were prepared by coupling alkylamine-resin with a hydroxynitrobenzoic acid. Active esters and sulfonic acid esters react with a diverse set of amino nucleophiles to generate arrays of amides and sulfonamides that are useful in drug discovery.

The novel active ester resins based upon a variety of resin compositions have broad applications, particularly because previously used resins had limited usage in organic solvents because of their poor swelling properties in hydrophilic solvents. The resins of the present invention can be used in most conventionally used solvents, including aqueous media. Additionally, production expenses are much lower than for comparable tetrafluorophenol resins.

Thus, the present invention makes it possible to synthesize arrays of highly pure amide and sulfonamide libraries by providing reactive acylating and sulfonylating reagents. Active carboxylic esters and sulfonic acid esters react with a diverse set of amine nucleophiles to generate arrays of amides and sulfonamides that are useful in drug discovery.

Any primary or secondary amine can be used as the amine nucleophie to react with a carboxylic ester or sulfonic acid ester. Among the primary and secondary amines that can be used in the present invention are the following:
1-cyclohexylpiperazine;
1-(2-pyridyl)piperazine;
dimethylamine 6-amino-1-hexanol;
(S)-(+)-leucinol;
n-butylamine;
phenethylamine;
(R)-(+)-(naphthyl)ethylamine;
octylamine;
decylamine.

The resins of the present invention will be used as tools in amide/sulfonamide library synthesis, and eventually for drug discovery. These resins will also be used as labeling reagents for biologically important amines and proteins in various conditions, including aqueous media, which is important in the field of proteomics.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

REFERENCES (1) Merrifield, R. B. *J. Am. Chem. Soc.* 1963, 85, 2149–2154.
(2) Cabilly, S. *Combinatorial peptide library protocols*; Humana Press: Totowa, N.J., 1998.
(3) Blaney, P.; Grigg, R.; Sridharan, V. *Chem. Rev.* 2002, 102, 2607–2624.
(4) Jung, G. *Combinatorial chemistry: synthesis, analysis, screening*; Wiley-VCH: Weinheim; Cambridge, 1999.
(5) Dörwald, F. Z. *Organic synthesis on solid phase: supports, linkers, reactions*; Wiley-VCH: Weinheim; Chichester, 2000.
(6) Seneci, P. *Solid phase synthesis and combinatorial technologies*; John Wiley & Sons: New York, 2000.
(7) Dolle, R. E.; Nelson, K. H., Jr. *J. Comb. Chem.* 1999, 1, 235–282
(8) Dolle, R. E. *J. Comb. Chem.* 2000, 2, 383–433.
(9) Dolle, R. E. *J. Comb. Chem.* 2001, 3, 477–517.
(10) Plante, O. J.; Palmacci, E. R.; Seeberger, P. H. *Science* 2001, 291, 1523–1527.
(11) Kanemitsu, T.; Wong, C. H.; Kanie, O. *J. Am. Chem. Soc.* 2002, 124, 3591–3599.
(12) Copeland, G. T.; Miller, S. J. *J. Am. Chem. Soc.* 2001, 123, 6496–6502.
(13) Jarvo, E. R.; Evans, C. A.; Copeland, G. T.; Miller, S. J. *J. Org. Chem.* 2001, 66, 5522–5527.
(14) Ley, S. V.; Baxendale, I. R.; Bream, R. N.; Jackson, P. S.; Leach, A. G.; Longbottom, D. A.; Nesi, M.; Scott, J. S.; Storer, R. I.; Taylor, S. J. *J. Chem. Soc., Perkin Trans. 1* 2000, 3815–4195.
(15) Kim, K.; Le, K. *Synlett* 1999, 12, 1957–1959.
(16) Chang, Y. T.; Choi, J.; Ding, S.; Prieschl, E. E.; Baumruker, T.; Lee, J. M.; Chung, S. K.; Schultz, P. G. *J. Am. Chem. Soc.* 2002, 124, 1856–1857.
(17) Salvino, J. M.; Kumar, N. V.; Orton, E.; Airey, J.; Kiesow, T.; Crawford, K.; Mathew, R.; Krolikowski, P.; Drew, M.; Engers, D.; Krolikowski, D.; Herpin, T.; Gardyan, M.; McGeehan, G.; Labaudiniere, R. *J. Comb. Chem.* 2000, 2, 691–697.
(18) Hahn, H. G.; Chang, K. H.; Nam, K. D.; Bae, S. Y.; MAh, H. *Heterocycles* 1998, 48, 2253–2261.
(19) Parlow, J. J.; Normansell, J. E. *Mol. Divers.* 1995, 1, 266–269.
(20) Masala, S.; Taddei, M. *Org. Lett.* 1999, 1, 1355–1357.
(21) Adamczyk, M.; Fishpaugh, J. R.; Mattingly, P. G. *Bioorg. Med. Chem. Lett.* 1999, 9, 217–220.
(22) Adamczyk, M.; Fishpaugh, J. R.; Mattingly, P. G. *Tetrahedron Lett.* 1999, 40, 463–466.
(23) Katoh, M.; Sodeoka, M. *Bioorg. Med. Chem. Lett.* 1999, 9, 881–884.
(24) Chang, Y. T.; Schultz, P. G. *Bioorg. Med. Chem. Lett.* 1999, 9, 2479–2482.
(25) Cohen, B. J.; Karolyhafeli, H.; Patchornik, A. *J. Org. Chem.* 1984, 49, 922–924.
(26) Dendrinos, K.; Jeong, J.; Huang, W.; Kalivretenos, A. G. *J. Chem. Soc., Chem. Commun.* 1998, 499–500.
(27) Pop, I. E.; Deprez, B. P.; Tartar, A. L. *J. Org. Chem.* 1997, 62, 2594–2603.
(28) Scialdone, M. A.; Shuey, S. W.; Soper, P.; Hamuro, Y.; Burns, D. M. *J. Org. Chem.* 1998, 63, 4802–4807.

(29) Lumma, W. C.; Witherup, K. M.; Tucker, T. J.; Brady, S. F.; Sisko, J. T.; Naylor-Olsen, A. M.; Lewis, S. D.; Lucas, B. J.; Vacca, J. P. *J. Med. Chem.* 1998, 41, 1011–1013.
(30) Walsh, D. P.; Pang, C.; Parikh, P. B.; Kim, Y. S.; Chang, Y. T. *J. Comb. Chem.* 2002, 4, 204–208.
(31) Corbett, A. D.; Gleason, J. L. *Tetrahedron Lett.* 2002, 43, 1369–1372.
(32) Jaroniec, C. P.; Gilpin, R. K.; Jaroniec, M. J. *Phy. Chem. B* 1997, 101, 6861–6866.
(33) Shimizu, I.; Yoshino, A.; Okabayashi, H.; Nishio, E.; OConnor, C. J. *J. Chem. Soc., Faraday Trans.* 1997, 93, 1971–1979.

What is claimed is:

1. Nitrophenol resins on a support selected from compounds of the following formula:

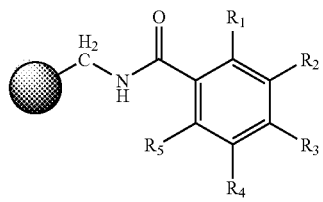

wherein one of $R_1$, $R_2$, $R_3$, $R_4$, and $R_5$ is OH;
at least one of $R_1$, $R_2$, $R_3$, $R_4$, and $R_5$ is $NO_2$;
the $R_1$, $R_2$, $R_3$, $R_4$ and $R_5$ that are not OH or $NO_2$ are selected from the group consisting of hydrogen, substituted and unsubstituted alkyl groups, and substituted and unsubstituted aryl groups; and

is a solid support.

2. The nitrophenol resin according to claim 1 wherein the solid support is selected from the group consisting of polystyrene, Tantagel, polyethylene glycol dimethacrylamide copolymers, macroporous resins, and silica gel.

3. A method for synthesizing nitrophenol resins according to claim 1 comprising forming amide bonds between hydroxynitrobenzoic acids and an amino-alkyl polymer support.

4. The method according to claim 3 wherein the coupling scheme is 1,3-diisopropylcarbodiimide-1-hydroxybenzotriazole and 1-hydroxybenxotriazole.

5. The method according to claim 3 wherein the coupling occurs in a solvent selected from the group consisting of N,N-dimethyl formamide, 1-methyl-2pyrrolidinome tetrahydrofurene, and methylene chloride.

6. A method for synthesizing nitrophenol resins according to claim 1 comprising hydrolyzing chlorobenzene.

7. The method according to claim 6 wherein an alkylamino resin is coupled with 4-chloro-3-nitrobenzoic acid.

8. A method for preparing carboxyl ester resins comprising reacting an acyl halide with a nitrophenol resin on a support selected from compounds of the following formula:

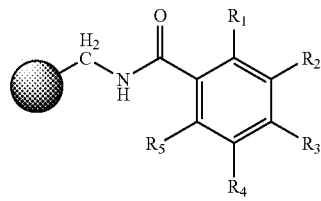

wherein one of $R_1$, $R_2$, $R_3$, $R_4$ and $R_5$ is OH;
at least one of $R_1$, $R_2$, $R_3$, $R_4$ and $R_5$ is $NO_2$;
the $R_1$, $R_2$, $R_3$, $R_4$ and $R_5$ that are not OH or $NO_2$ are selected from the group consisting of hydrogen, substituted and unsubstituted alkyl groups, and substituted and unsubstituted aryl groups; and

is a solid support.

9. A method for preparing sulfonyl ester resins comprising reacting a sulfonyl halide with a nitrophenol resin on a support selected from compounds of the following formula:

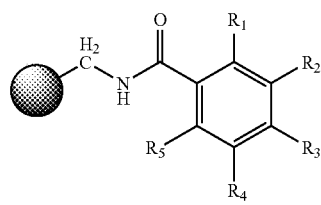

wherein one of $R_1$, $R_2$, $R_3$, $R_4$ and $R_5$ is OH;
at least one of $R_1$, $R_2$, $R_3$, $R_4$ and $R_5$ is $NO_2$;
the $R_1$, $R_2$, $R_3$, $R_4$ and $R_5$ that are not OH or $NO_2$ are selected from the group consisting of hydrogen, substituted and unsubstituted alkyl groups, and substituted and unsubstituted aryl groups; and

is a solid support.

10. A method for preparing amides comprising reacting an amine with a carboxyl ester resin produced according to claim 8.

11. The method according to claim 10 wherein the amine is selected from the group consisting of 1-cyclohexylpiperazine, 1-(2-pyridyl)piperazine, dimethylamine, 6-amino-1-hexanol, (S)-(+)-leucinol, n-butylamine, phenethylamine, (R)-(+)-(naphthyl)ethylamine, octylamine, and decylamine.

* * * * *